US012744047B1

(12) United States Patent
Buethe et al.

(10) Patent No.: US 12,744,047 B1
(45) Date of Patent: Sep. 22, 2026

(54) ADAPTIVE ENHANCEMENT OF CODED SPEECH

(71) Applicant: Amazon Technologies, Inc., Seattle, WA (US)

(72) Inventors: Jan Buethe, Munich (DE); Jean-Marc Valin, Montreal (CA); Ahmed Mustafa, Aachen (DE)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 18/345,305

(22) Filed: Jun. 30, 2023

(51) Int. Cl.
*G10L 19/26* (2013.01)

(52) U.S. Cl.
CPC .................................... *G10L 19/26* (2013.01)

(58) Field of Classification Search
None
See application file for complete search history.

(56) References Cited

U.S. PATENT DOCUMENTS

| | | | | |
|---|---|---|---|---|
| 9,741,351 | B2 * | 8/2017 | Vinton | G10L 19/26 |
| 11,521,637 | B1 | 12/2022 | Valin et al. | |
| 2012/0140938 | A1 * | 6/2012 | Yoo | G10L 21/02 381/63 |
| 2024/0274144 | A1 * | 8/2024 | Shi | G10L 21/0208 |
| 2025/0014584 | A1 * | 1/2025 | Pia | G10L 19/032 |

OTHER PUBLICATIONS

J.-H. Chen and A. Gersho, "Adaptive Postfiltering for Quality Enhancement of Coded Speech," IEEE Transactions on Speech and Audio Processing, vol. 3, No. 1, pp. 59-71, 1995.
Z. Zhao, H. Liu, and T. Fingscheidt, "Convolutional Neural Networks to Enhance Coded Speech," IEEE/ACM Transactions on Audio, Speech, and Language Processing, vol. 27, No. 4, pp. 663-678, 2019.
J. Skoglund and J.-M. Valin, "Improving Opus Low Bit Rate Quality with Neural Speech Synthesis," in Proc. INTERSPEECH, 2019, pp. 2847-2851.
K. Gupta, S. Korse, B. Edler, and G. Fuchs, "A DNN Based Post-Filter to Enhance the Quality of Coded Speech in MDCT Domain," in Proc. International Conference on Acoustics, Speech and Signal Processing (ICASSP), 2022, arXiv:2201.12039v1, pp. 1-5.
S. Korse, K. Gupta, and G. Fuchs, "Enhancement of Coded Speech Using a Mask-Based Post-Filter," in Proc. International Conference on Acoustics, Speech and Signal Processing (ICASSP), 2020, arXiv:2010.05571v1, pp. 1-5.

(Continued)

*Primary Examiner* — Nicole A K Schmieder
(74) *Attorney, Agent, or Firm* — S. Scott Foster; Kowert, Hood, Munyon, Rankin & Goetzel, P.C.

(57) ABSTRACT

Adaptive code enhancement includes receiving feature data of a speech waveform having a plurality of frames, inferring a bitrate based on a quantity of bits of the plurality of frames received from the decoder codec, generating one or more latent feature vectors in accordance with the bitrate and based on the feature data, receiving one or more pitch lags and a speech signal, calculating filter coefficients on a per-frame basis based on the one or more latent feature vectors and the one or more pitch lags, and modifying the speech signal using the one or more filter coefficients to generate a modified speech signal.

18 Claims, 6 Drawing Sheets

(56) References Cited

OTHER PUBLICATIONS

S. Korse, N. Pia, K. Gupta, and G. Fuchs, "PostGAN: A GAN-Based Post-Processor to Enhance the Quality of Coded Speech," in Proc. International Conference on Acoustics, Speech and Signal Processing (ICASSP), 2022, arXiv:2201.13093v1, pp. 1-5.
P. Ochieng, "Deep Neural Network Techniques for Monaural Speech Enhancement: State of the Art Analysis," arXiv:2212.00369, 2022, pp. 1-46.
J -M. Valin, K. Vos, and T. B. Terriberry, "Definition of the Opus Audio Codec," RFC 6716, 2012, 1 page.
J.-M. Valin and J. Skoglund, "A Real-Time Wideband Neural Vocoder at 1.6kb/s Using LPCNet," in Proc. INTERSPEECH, 2019, pp. 3406-3410.
W. B. Kleijn, A. Storus, M. Chinen, T. Denton, F. S. C. Lim, A. Luebs, J. Skoglund, and H. Yeh, "Generative Speech Coding with Predictive Variance Regularization," in IEEE Proc. International Conference on Acoustics, Speech and Signal Processing (ICASSP), 2021, pp. 6478-6482.
N. Zeghidour, A. Luebs, A. Omran, J. Skoglund, and M. Tagliasacchi, "SoundStream: An End-to-End Neural Audio Codec," IEEE/ACM Transactions on Audio, Speech, and Language Processing, vol. 30, pp. 495-507, 2022 (ArXiv preprint: arXiv:2107.03312v1).
N. Pia, K. Gupta, S. Korse, M. Multrus, and G. Fuchs, "NESC: Robust Neural End-2-End Speech Coding with GANs," in Proc. INTERSPEECH, 2022, arXiv:2207.03282v1, pp. 1-5.
T. Jenrungrot, M. Chinen, W. Kleijn, J. Skoglund, Z. Borsos, N. Zeghidour, and M. Tagliasacchi, "Lmcodec: A low bitrate speech codec with causal transformer models," in Proc. International Conference on Acoustics, Speech and Signal Processing (ICASSP), 2023, pp. 1-5.
T. Salimans and D. P. Kingma, "Weight Normalization: A Simple Reparameterization to Accelerate Training of Deep Neural Networks," 30th Conference on Neural Information Processing Systems (NIPS 2016), Barcelona, Spain, pp. 1-9.
I. Demirsahin, O. Kjartansson, A. Gutkin, and C. Rivera, "Open-source Multi-speaker Corpora of the English Accents in the British Isles," in Proceedings of the 12th Conference on Language Resources and Evaluation (LREC 2020), pp. 6532-6541.
O. Kjartansson, A. Gutkin, A. Butryna, I. Demirsahin, and C. Rivera, "Open-Source High Quality Speech Datasets for Basque, Catalan and Galician," in Proceedings of the 1st Joint SLTU and CCURL Workshop (SLTU-CCURL 2020), pp. 21-27.
K. Sodimana, K. Pipatsrisawat, L. Ha, M. Jansche, O. Kjartansson, P. D. Silva, and S. Sarin, "A Step-by-Step Process for Building TTS Voices Using Open Source Data and Framework for Bangla, Javanese, Khmer, Nepali, Sinhala, and Sundanese," in The 6th Intl. Workshop on Spoken Language Technologies for Under-Resourced Languages, pp. 66-70, 2018.
A. Guevara-Rukoz, I. Demirsahin, F. He, S.-H. C. Chu, S. Sarin, K. Pipatsrisawat, A. Gutkin, A. Butryna, and O. Kjartansson, "Crowdsourcing Latin American Spanish for Low-Resource Text-to-Speech," in Proceedings of the 12th Conference on Language Resources and Evaluation (LREC 2020), pp. 6504-6513.
Y. M. Oo, T. Wattanavekin, C. Li, P. De Silva, S. Sarin, K. Pipatsrisawat, M. Jansche, O. Kjartansson, and A. Gutkin, "Burmese Speech Corpus, Finite-State Text Normalization and Pronunciation Grammars with an Application to Text-to-Speech," in Proceedings of the 12th Conference on Language Resources and Evaluation (LREC 2020), pp. 6328-6339.
D. van Niekerk, C. van Heerden, M. Davel, N. Kleynhans, O. Kjartansson, M. Jansche, and L. Ha, "Rapid development of TTS corpora for four South African languages," 2017 ISCA, in Proc. INTERSPEECH, 2017, pp. 2178-2182.
A. Gutkin, I. Demirs, ahin, O. Kjartansson, C. Rivera, and K. T'ub'o. s'un, "Developing an Open-Source Corpus of Yoruba Speech," in Proc. INTERSPEECH, 2020 ISCA, pp. 404-408.
E. Bakhturina, V. Lavrukhin, B. Ginsburg, and Y. Zhang, "Hi-Fi Multi-Speaker English TTS Dataset," in Proc. INTERSPEECH, 2021, pp. 2776-2780 (retrieved from arXiv:2104.01497v3, 2021 pp. 1-5).
B. Moore, "An Introduction to the Psychology of Hearing". Brill, Sixth Edition, pp. 1-456, 2013.
K. Vos, K. Sorensen, S. Jensen, and J.-M. Valin, "Voice Coding with Opus," 135th AES Convention, pp. 722-731, 2013.

* cited by examiner

ADAPTIVE ENHANCEMENT OF CODED SPEECH

BACKGROUND

Improving the quality of coded speech may be used as a form of speech enhancement and has seen rapid advances through the use of deep neural networks (DNNs). Several enhancement models operate in the frequency domain. For example, frequency domain masking may be used to enhance coded speech. With frequency domain processing, however, enhancing the harmonic structure of a signal may require a sufficiently high frequency resolution sacrificing temporal resolution. Also, with frequency domain processing, overlapping windows may be required which induces delay. In addition, time domain models may need a sufficiently deep structure to build up a sufficiently large receptive field which may cause these models to be usually larger in size and computationally complex.

Figure 1:
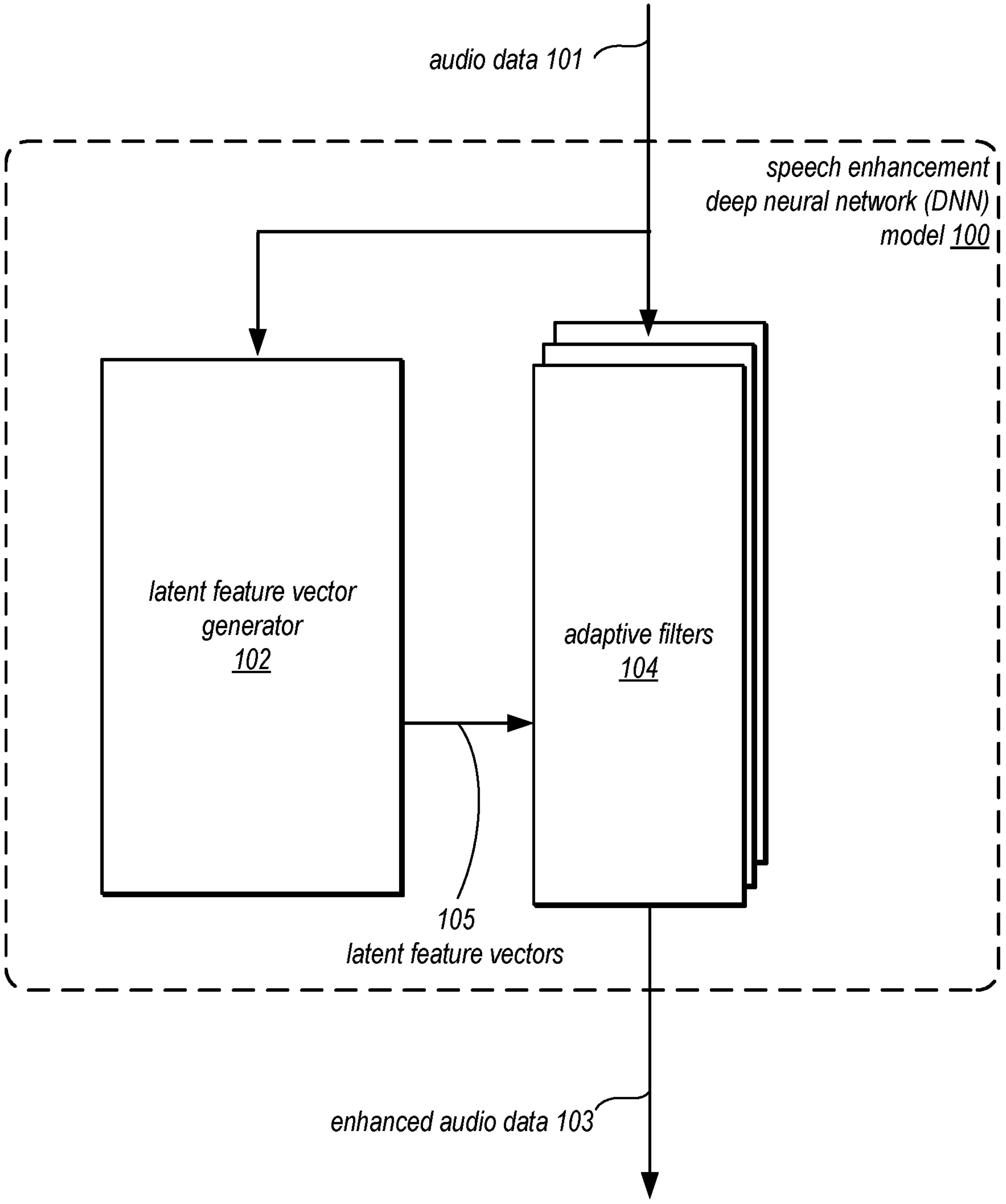
FIG. 1 illustrates a logical block diagram of an example speech enhancement model, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Encoding techniques are useful in a wide variety of scenarios to facilitate audio communications (or communications that include audio, such as video communications).

For example, when a device, such as mobile phone or other mobile computing device, desktop computer, "smart" speaker, or other device that supports audio communications, captures speech (e.g., using a microphone), encoding techniques are used to transform the raw audio data including the speech captured by the device before transmitting the encoded audio data to one or more recipients over a network (e.g., over a wide area network such as the Internet). Different techniques for encoding audio data that include speech can affect the quality of the decoded audio data that is ultimately played back at a speaker at a recipient device (which may also be a mobile phone or other mobile computing device, desktop computer, "smart" speaker, or other device that supports audio communications).

While improvements to the encoding techniques can be made to reduce negative quality effects on speech when audio is decoded, additional speech enhancement techniques may be performed for encoded audio data to further enhance speech audio. Machine learning techniques that utilize trained machine learning models to enhance speech in encoded audio data (also referred to as "coded speech") have greatly improved the performance of speech enhancement techniques to remove noise or other sound artifacts that would otherwise diminish the playback quality of the speech at a recipient device. However, the computing resources available for performing speech enhancement using machine learning models can vary greatly. As noted above, many different types of devices, with different processor, memory, and other resource capacities can participate in audio communications. For instance, trained machine learning models implemented as deep neural networks can in some implementations utilize large amounts of processor and memory to execute a speech enhancement process. Therefore, techniques that can provide highly performant machine learning speech enhancement useable across many different devices are highly desirable. The improvements that machine learning techniques offer to the quality of audio communications by enhancing coded speech can be made available to more devices with less impact on those devices to utilize computing resources for other tasks.

Techniques for providing adaptive enhancement of coded are described herein provide a light-weight machine learning model for enhancing coded speech received as part of audio communications with broad applicability to fit within the resource capacities of many different types of devices. In order to determine how such a light-weight machine learning model for enhancing coded speech can be provided, many different aspects of enhancing coded speech may be accounted for. If, for instance, machine learning model is to maintain and/or improve the quality coded speech without requiring high frequency resolution, and while maintaining a small model size and low computation complexity, a light-weight machine learning model based on adaptive convolutions is provided. Adaptive convolutions are features of neural network machine learning models that perform a convolution operation on input data with dynamically generated filter values. In applying adaptive convolutions to enhance coded speech, the audio data (sometimes referred to as the audio signal) may be processed through adaptive convolution features of a machine learning model in order to modify the audio signal in a way that enhances speech.

As discussed in detail below, adaptive enhancement of coded speech may take advantage of the adaptive aspect of adaptive convolutions and other types of adaptive filtering, such as adaptive comb filtering (which adds a delayed and filtered version of the audio signal to itself), so that the machine learning model does not have a larger size or otherwise consume a large amount of computing resources, making the machine learning model for enhancing speech deployable in many different devices. Techniques for implementing a machine learning model with adaptive filters may include utilizing adaptive filter kernels for digital signal audio processing. These kernels may implement a smoothing technique to modify the input audio signal as part of enhancing audio speech. Kernels may be implemented as a matrix of values (kernel coefficients) that are applied to the values of the audio signal (which may also be represented as a matrix) to modify the values of the audio signal to achieve various goals, such as enhancement of speech in the audio signal. By making the filter kernels adaptive, the values of the filter kernel may change over time according to the changing features of the audio signal. This allows the machine learning model to process the coded speech in the audio signal with a single channel (lowering computing resources used). As it can make use of a single channel, the adaptive filtering techniques may be consider "linear" adaptive filtering techniques.

The adaptive kernel filter techniques also make use of a pitch lag estimate (which represents an estimate of the delay in the fundamental period of pitch in the audio signal), to keep the number of non-zero adaptive kernel filter coefficients small. Because the number of non-zero kernel filter coefficients are small, the enhancement provided by adaptive kernel filtering can still improve the quality of the coded speech while maintaining a small model size and low computational complexity for storing and executing speech enhancement using the machine learning model.

As discussed in detail below with regard to FIGS. 1 and 4, the machine learning model may include multiple, different types of adaptive filters to perform speech enhancement on audio data received after decoding the previously encoded audio data. Because the adaptive filters operate on decoded audio data, the adaptive filters may sometimes be referred to as post filters (as they are applied post decoder processing). Different types of adaptive filters may implement different filtering techniques. For instance, adaptive convolutional filtering, as discussed above, may be implemented as one type of adaptive filter. Another type of adaptive filter may be an adaptive comb filter.

The arrangement and objective of different types of adaptive filters may be used to perform different aspects of enhancing speech. In some embodiments, one (or more) of the adaptive comb filters, discussed in detail below, may be implemented as a long-term post filter section (e.g., in cascade). The long-term section enhances speech by emphasizing pitch harmonics and attenuates the spectral valleys between pitch harmonics. Another section of the machine learning model may be a short-term post filter section, which may be implemented by the adaptive convolutional filter discussed in detail below. The short-term post filter section enhances speech audio by filtering the audio signal to emphasize speech formants (e.g., spectral maximums, also referred to as peaks) and attenuates the spectral valleys between formants. Additionally, the short-term section performs spectral tilt compensation (e.g. compensating for a phenomenon in speech where a speaker lowers or raises their voice) and automatic gain control (e.g., to automatically adjust the audio signal in the enhanced speech output to prevent it from becoming too quiet or too loud). By minimizing the spectral tilt in its frequency response. As a result, the machine learning model achieves noticeable noise reduction while introducing only minimal distortion in speech.

Furthermore, a machine learning model that implement techniques for adaptive enhancement of coded speech may be compatible with or used in addition to many different types of codecs, which may be software implementations (e.g., libraries) that perform encoding and decoding of audio data for audio transmission. For example, some codecs may already provide features or output format for the decoded audio data that support adaptive filtering in the machine learning model, such as the features used to determine filter coefficients as discussed in detail below.

In a further example, some codecs (e.g., SILK™ of OPUS™) may implement an embedded coding mode in a codec that supports seamless switching between modes that are optimized for encoding different types of audio data (e.g., speech or real-time music performance). Seamless mode switching may added an operational requirement of zero delay. However, because the machine learning model may be trained to operate in a way that is phase preserving, ensuring zero-delay, the machine learning model implementing adaptive enhancement for coded speech can still be used with codecs that support seamless mode switching.

A further improvement offered by a machine learning model implementing adaptive enhancement of coding speech is that perceptual evaluation of speech quality (PESQ) techniques can be used to verify that the machine learning model objectively improves a codec between a range of data rates (e.g., between six (6) and twenty-two (22) kilobits per second (Kbps).

A machine learning model that implements adaptive enhancement of coded speech may be understood using the following representative equations. For example, the act of generating enhanced speech in audio data (e.g., by using the machine learning model discussed above) may generally be related to techniques that perform denoising an audio signal (obtained from the decoder of a codec) to obtain a clean sound signal, x(t), at a time (t) from a noisy sound mixture, y(t), at the time (t), that includes noise, n(t), which may be characterized in equation (1).

$$y(t)=x(t)+n(t) \qquad \text{Equation (1).}$$

However, as a result of using a speech codec (or any other perceptual codec) to encode and then decode the audio data, the coding noise n(t) may be too closely related to the signal itself to use techniques that cancel (e.g., by masking) noise from the audio signal. To recover the clear sound signal x(t) from noisy sound mixture y(t) may not be feasible nor desirable. Instead, a machine learning model that implements adaptive enhancement for coded speech may approach the challenge of obtaining clean audio by implementing adaptive filters to reshape a noise n(t). For example, based on the noisy sound mixture, the machine learning model with adaptive filtering may produce an enhanced sound signal $\hat{y}(t)$ such that the reshaping coding noise $\hat{n}(t)$, as characterized in equation (2), is less audible than the coding noise n(t) used with the denoising approach mentioned above.

$$\hat{y}(t)=x(t)+\hat{n}(t) \qquad \text{Equation (2).}$$

Another consideration for implementing a machine learning model with adaptive enhancement of coded speech is that spectral valleys (of the audio signal) may be identified as the main source for audible noise caused by encoding. The spectral valleys may include both the narrow valleys between harmonics for voiced speech parts as well as wider valleys between formants, the peaks of the spectral envelope (a portion of the audio signal in a window of time in the frequency and amplitude planes). Inter-harmonic noise (noise between voice speech parts) may be reduced using a long-term post filter, as noted above may be an adaptive comb-filter that makes explicit use of the pitch lag (the delay in the fundamental period of pitch in the audio signal) emphasizing multiples of the fundamental frequency and attenuates frequencies in between. It should be noted that such a long-term post-filter may need encoder control, in some embodiments, which may not be available for some codecs. Formant enhancement may be performed with a short-term-filter, as noted above, which may be derived from the short-term linear prediction coefficients in code-excited linear prediction (CELP) codecs. Combining these concepts, where t is an instance in time, where h is the impulse response, and where τ is the delay length, results in adaptive filtering as characterized in Equation (3).

$$\hat{y} = \sum_{\tau=0}^{\infty} [h(t, \tau) y(t - \tau)]. \quad \text{Equation (3)}$$

A finite version of the adaptive filtering which may be implemented in a machine learning model is characterized below with regard to equation (4), where T may be determined based on the pitch lag (e.g. 2 times the maximal pitch lag)

$$\hat{y} = \sum_{\tau=0}^{T} [h(t, \tau) y(t - \tau)]. \quad \text{Equation (4)}$$

While training a machine learning model to learn the filter coefficients directly may be possible, such techniques may be inefficient. Instead, in various embodiments, the machine learning model may implement multiple consecutive adaptive comb filters (as discussed below with regard to FIG. 4), which may result in sparse or few filters for large pitch lags. Training the comb filters to be adaptable allows them to may apply formant and pitch enhancement to the audio signal and also address temporal artifacts.

As depicted in FIG. 1 (and FIG. 4), adaptive filters may be positioned within the sound signal path and may be adapted with features derived from a codec decoder and encoded into a sequence of latent feature vectors by a latent feature generator. In some aspects, the latent feature vectors may be produced at rate corresponding to a sub-frame rate of the codec (e.g., 200 Hz for SILK™ of OPUS™). In some aspects, the feature processing may be casual such that the features may not use information beyond a current frame of the codec (e.g., beyond a 20 ms frame for SILK™ of OPUS™).

FIG. 1 illustrates a logical block diagram of an example speech enhancement machine learning model 100 that implements adaptive enhancement of coded speech may be deep neural network (DNN), according to some embodiments. The model 100 may be implemented as part of, or in addition to, a codec provided by many different sources, including device providers that participate in audio communications (or other systems that perform or include audio data transmission), a provider network 200 illustrated in FIG. 2 which may implement an audio transmission service that facilitates audio communications for which the machine learning model may be applied (e.g., at a client device) to obtain speech enhanced audio, such as may be discussed in further detail with regard to the model 100 illustrated in FIGS. 3A, 3B, and 3C, the speech enhancement model 400 illustrated in FIG. 4, and/or the system 600 illustrated in FIG. 6. The model 100 may also implement one or more steps of the method illustrated and described with respect to FIG. 5.

As shown in FIG. 1, the speech enhancement model 100 may include a latent feature vector generator 102 (e.g., a feature encoder), and a plurality of adaptive filters 104. The model 100 may receive a speech signal 101 (e.g., audio data) from one or more microphones and/or one or more audio data storage devices. The speech signal 101 may be encoded according to a speech codec. In some aspects, the model 100 may determine a bitrate for the speech signal 101 based on a quantity of bits for a plurality of frames of the speech signal 101. In some aspects, the model 100 may extract feature data from the speech signal 101. The latent feature vector generator 102 may encode the feature data to produce one or more latent feature vectors 105, for example, according to the bitrate for the speech signal 101. The adaptive filters 104 may filter the speech signal 101 according to a plurality of filter coefficients that are dynamically adjusted on a per-frame basis using the one or more latent feature vectors 105. In some aspects, the adaptive filters 104 may include at least one short-term filter and at least one long-term filter. In some aspects, a short-term filter may have a response time that is shorter than its periods. In some aspects, the at least one short-term filter may be an adaptive convolution filter, as described herein. In some aspects, the at least one long-term filter may be a comb filter, as described herein. The model 100 may provide the filtered speech signal from the adaptive filters 104 as an enhanced speech signal (e.g., a speech-enhanced audio data) 103.

This specification includes a general description of a provider network that implements multiple different services (FIG. 2), including an audio-transmission service, which implements adaptive coding enhancement as described herein. Then various examples of, including different components/modules, or arrangements of components/modules that may be employed as part of implementing the services are discussed in FIGS. 3A-3C. A number of different methods and techniques to implement adaptive coding enhancement are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
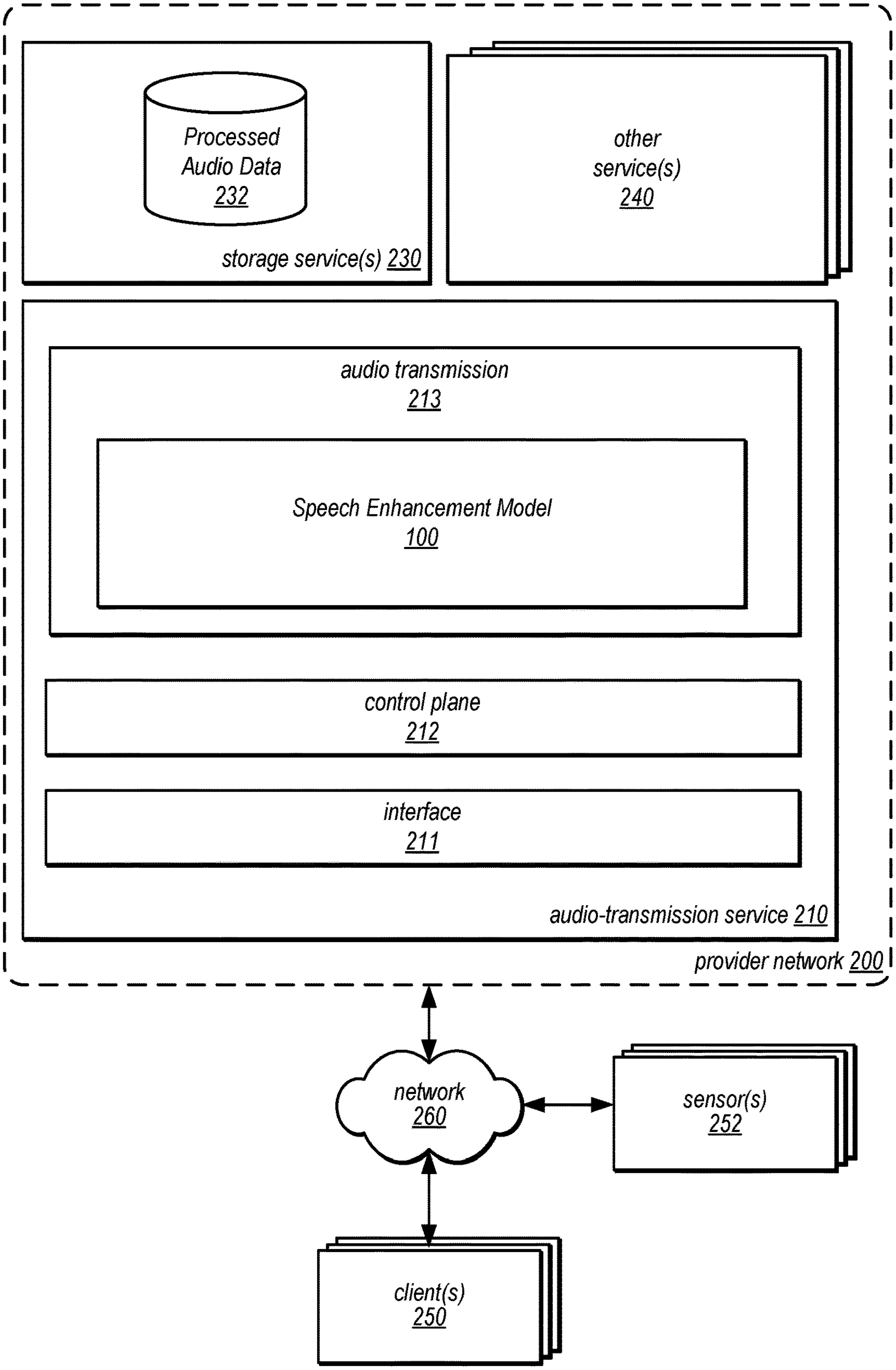
FIG. 2 illustrates an example provider network that may implement an audio-transmission service that implements speech enhancement, according to some embodiments.

FIG. 2 illustrates an example provider network 200 that may implement an audio-transmission service that implements adaptive enhancement of coded speech, according to some embodiments. The provider network 200 may include one or more features or aspects of the speech enhancement model 100 illustrated in FIG. 1, the speech enhancement model 100 illustrated in FIG. 2, the audio-transmission service 210 illustrated in FIGS. 2, 3A, 3B, and 3C, and/or the system 600 illustrated in FIG. 6. The provider network 200 may also implement one or more steps of the method illustrated and described with respect to FIG. 5.

Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 600 described below with regard to FIG. 6), needed to implement and distribute the infrastructure and services offered by the provider network 200, in one embodiment. In some embodiments, provider network 200 implements various computing resources or services, such as audio-transmission service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 6 and described below, in one embodiment. In various embodiments, the functionality of a given system or service component (e.g., a component of audio-transmission service 210 may be implemented by a particular node or may be distributed across several nodes. In some embodiments, a given node may implement the functionality of more than one service system component (e.g., more than one data store component).

Audio-transmission service 210 implements interface 211 to allow clients (e.g., client(s) 250 or clients implemented internally within provider network 200, such as a client application hosted on another provider network service like an event driven code execution service or virtual compute service) to send audio data (e.g., speech input waveform or acoustic feature representation of a speech waveform) for processing, enhancement, storage, and/or transmission. In at least some embodiments, audio-transmission service 210 also supports the transmission of video data along with the corresponding audio data and thus may be an audio/video transmission service, which may perform the various techniques discussed herein with regard to FIGS. 1 and 4 and below with regard to FIGS. 3A, 3B, 3C, 5, and 6 for audio data captured along with video data. For example, audio-transmission service 210 may implements interface 211 (e.g., a graphical user interface, programmatic interface that implements Application Program Interfaces (APIs) and/or a command line interface) so that a client application can submit an audio stream captured by sensor(s) 252 to be stored as enhanced audio data 232 stored in storage service(s) 230, or other storage locations or resources within provider network 200 or external to provider network 200 (e.g., on premise data storage in private networks). Interface 211 allows a client to cause audio processing using the techniques discussed above with regard to FIGS. 1 and 4 and herein with regard to FIGS. 3A, 3B, 3C, 5, and 6 (e.g., as part of audio transmission, such as voice transmission like Voice over IP (VoIP) or as part of an audio/video transmission in accordance with WebRTC or another suitable audio/video transmission protocols.

Audio-transmission service 210 implements a control plane 212 to perform various control operations to implement the features of audio-transmission service 210. For example, control plane 212 may monitor the health and performance of requests at different components of the audio-transmission 213 and of the audio processing (e.g., the health or performance of various nodes implementing these features of audio-transmission service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s). For example, control plane 212 may receive requests interface 211 which may be a programmatic interface, and identify an available node to begin work on the request.

Audio-transmission service 210 implements audio-transmission 213, which may facilitate audio communications (e.g., for audio-only, video, or other speech communications), speech commands or speech recordings, or various other audio transmissions, as discussed in the examples below with regard to FIGS. 3A and 3B. Audio-transmission service 210 implements audio processing to provide an adaptive coding enhancer (e.g., the model 100 illustrated in FIG. 1, the model 400 illustrated in FIG. 4, or a similar system), which may include audio processing systems and techniques like those discussed below with regard to FIGS. 5 and 6. In embodiments, audio processing may implement adaptive coding enhancement as described herein. Although the audio processing is depicted as a part of implementing audio-transmission 213, in various embodiments some or all of the audio processing may be implemented separate from audio transmission 213 (e.g., performed before and/or after audio transmission 213).

Data storage service(s) 230 may implement different types of data stores for storing, accessing, and managing data on behalf of clients 250 as a network-based service that enables clients 250 to operate a data storage system in a cloud or network computing environment. Data storage service(s) 230 includes various kinds relational or non-relational databases, in some embodiments. Data storage service(s) 230 includes object or file data stores for putting, updating, and getting data objects or files, in some embodiments. Data storage service(s) 230 may be accessed via programmatic interfaces (e.g., APIs) or graphical user interfaces. Enhanced audio 232 is put and/or retrieved from data storage service(s) 230 via an interface for data storage services 230, in some embodiments, as discussed below with regard to FIG. 3C.

Generally speaking, clients 250 may encompass any type of client that can submit network-based requests to provider network 200 via network 260, including requests for audio-transmission service 210 (e.g., a request to enhance, transmit, and/or store audio data). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of audio-transmission service 210 (or other provider network 200 services) to implement various applications. In some embodiments, such an application includes sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 generates network-based services requests according to a Representational State Transfer (REST)-style network-based services architecture, a document or message-based network-based services architecture, or another suitable network-based services architecture.

In some embodiments, a client 250 provides access to provider network 200 to other applications in a manner that is transparent to those applications. In some aspects, client(s) 250 may implement speech enhancement directly for playback. Clients 250 convey network-based services requests (e.g., requests to interact with services like audio-transmission service 210) via network 260, in one embodiment. In various embodiments, network 260 encompasses any suitable combination of networking hardware and protocols necessary to establish network-based-based communications between clients 250 and provider network 200. For example, network 260 may generally encompass the various telecommunications networks and service providers that collectively implement the Internet. Network 260 also includes private networks such as local area networks (LANs) or wide area networks (WANs) as well as public or private wireless networks, in one embodiment. For example, both a given client 250 and provider network 200 are respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 communicate with provider network 200 using a private network rather than the public Internet.

Sensor(s) 252, such as microphones, may, in various embodiments, collect, capture, and/or report various kinds of audio data, (or audio data as part of other captured data like video data). Sensor(s) 252 may be implemented as part of devices, such as various mobile or other communication and/or playback devices, such as microphones embedded in "smart-speaker" or other voice command-enabled devices. In some embodiments, some or all of audio processing techniques are implemented as part of devices that include sensors 252 before transmission of enhanced audio to audio-transmission service 210, as discussed below with regard to FIGS. 3B and 3C.

As discussed above, different interactions between sensors that capture audio data and services of a provider network 200 invoke audio processing, in some embodiments. FIGS. 3A-3C illustrate logical block diagrams of different interactions of an audio sensor with provider network services for implementing adaptive enhancement of coded speech, according to some embodiments.

Figure 3A:
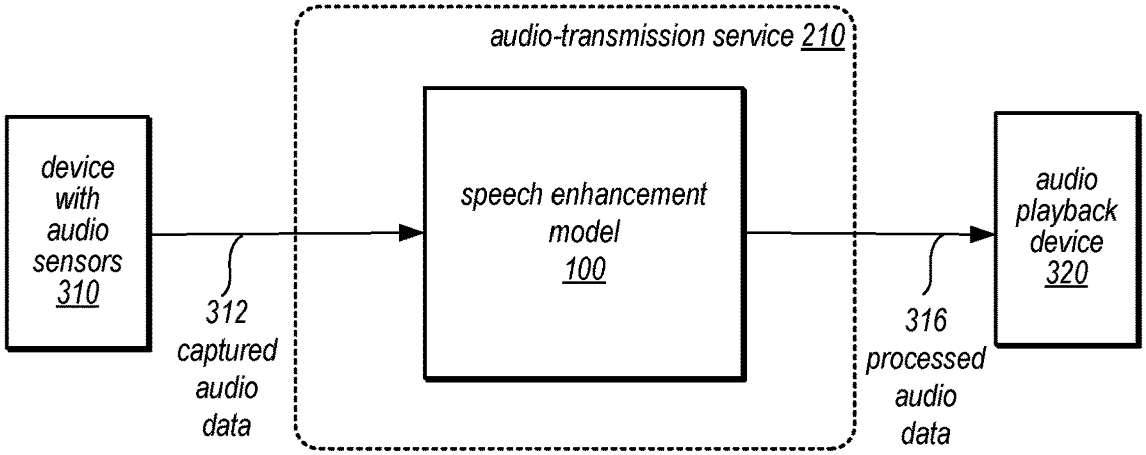
FIG. 3A illustrates a logical block diagram of an interaction of an audio sensor with provider network services, according to some embodiments.
Figure 3B:
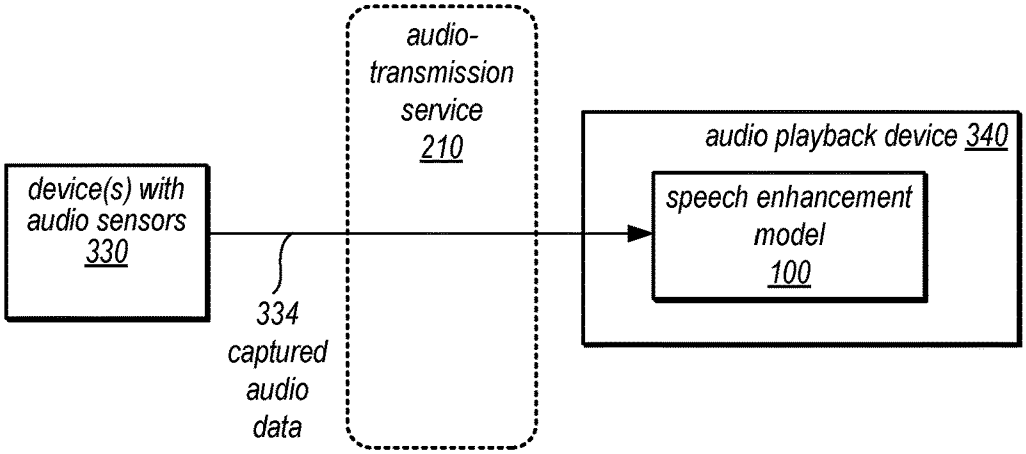
FIG. 3B illustrates a logical block diagram of an interaction of an audio sensor with provider network services, according to some embodiments.
Figure 3C:
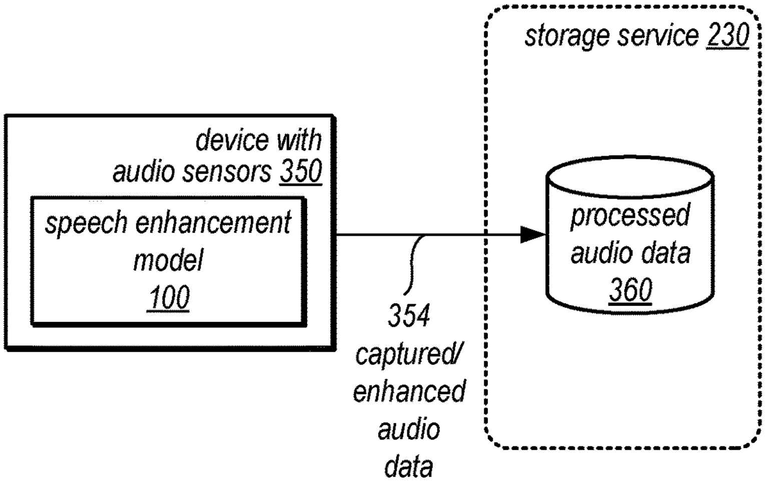
FIG. 3C illustrates a logical block diagram of an interaction of an audio sensor with provider network services, according to some embodiments.

In FIG. 3A, audio sensor 310 may capture audio data from various environments, including speech audio from noisy environments as discussed above with regard to FIGS. 1 and 4. Device with audio sensor 310 sends directly captured audio data 312 to audio-transmission service 210, in some embodiments, via an interface for audio-transmission service 210 (e.g., interface 211), such as by sending captured audio data 312 over wired or wireless network connection to audio-transmission service 210. In some embodiments, device with audio sensor 310 provides the captured audio data to another device that sends the captured audio data 312 to audio-transmission service (not illustrated). Capture audio data is transmitted as an audio file or object, or as a stream of audio, in some embodiments. For instance, for live communications, such as a VoIP call, captured audio data 312 is a stream of audio data.

Audio-transmission service 210 performs coding enhancement on captured audio data 312 through the adaptive filters 104, in various embodiments. For example, adaptive coding enhancers like those discussed with regard to FIGS. 1, 2, 4, and 5 are implemented to provide processed/enhanced audio data 316, including an output waveform as discussed above with regard to FIG. 1 and below with regard to FIGS. 1, 2, 4, and 5. Audio transmission service 210 receives the processed/enhanced audio data 316, identifies a destination for the enhanced audio, such as audio playback device 320, and sends the processed/enhanced audio data 316 to audio playback device 320, in some embodiments. Given the improvements to audio quality provided by audio processing, audio playback device 320 plays the processed/enhanced audio data 316 to one or more listeners (e.g., which may benefit from the improvements to the captured audio data in the form of more clear and perceptible speech).

Adaptive coding enhancers (e.g., linear-adaptive coding enhancers) may also be implemented separately from audio-transmission service 210, in some embodiments. For example, in FIG. 3B, the device with audio sensor 330 also implements adaptive coding enhancers or the audio playback device implement adaptive coding enhancers (e.g., receiver-side processing to re-construct a signal), such as with a system for coding enhancement (e.g., linear-adaptive coding enhancement) like those discussed with regard to FIGS. 1, 2, 4, and/or 5. In embodiments, the coding enhancement may be implemented as part of other pre-transmission or post-transmission processing, such as various encryption, compression, or other operations performed on capture audio data prior to transmission to audio-transmission service 210. In some embodiments, the audio transmission/processing is performed by the audio-transmission service 210. For example, the audio-transmission service 210 may be implemented as a mixing server that receives audio data from any number of parties/speakers for a meeting, and processes/decodes the audio data before sending it on to the audio playback device(s).

Device with audio sensor 330 then sends the captured/enhanced audio data 334 to audio-transmission service 210 for transmission (e.g., via interface 311), in some embodiments. Audio transmission 313 receives the enhanced audio data 334, identifies a destination for the enhanced audio, such as audio playback device 340, and sends the enhanced audio data 336 to audio playback device 340, in some embodiments. As mentioned above, in various embodiments, any portions of the adaptive coding enhancement process may be performed at the local client network (e.g., by the device with audio sensors 330), and remaining portions of the audio processing process may be performed by the provider network.

In some embodiments, audio is stored for later retrieval and/or processing. As illustrated in FIG. 3C, device with audio sensor 350 also implements adaptive coding enhancement 352, which may be a system for adaptive coding enhancement like those discussed below with regard to FIGS. 5 and 6 to provide enhanced audio data 354 as discussed herein with regard to FIGS. 1 and 4. Adaptive coding enhancement 352 may be implemented as part of other pre-transmission processing implemented by device with audio sensor 350, such as various encryption, compression, or other operations performed on capture audio data prior to storage in storage service 330. Device with audio sensor 350 then stores the captured/enhanced audio data 354 to storage service 330, which stores enhanced audio data 360 until retrieved for future processing and/or playback, in some embodiments.

Figure 4:
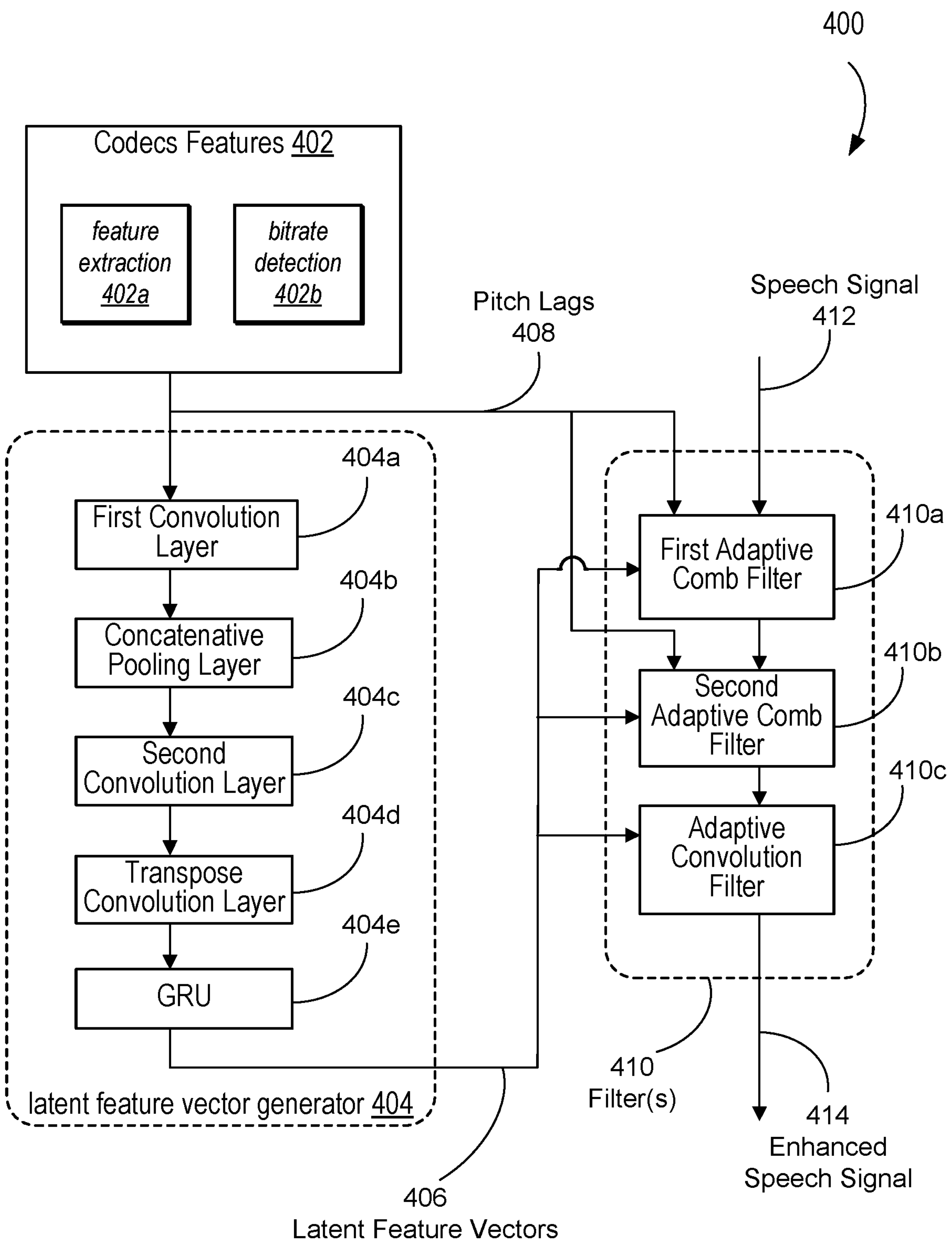
FIG. 4 illustrates a logical block diagram of an example speech enhancement model, according to some embodiments.
Figure 5:
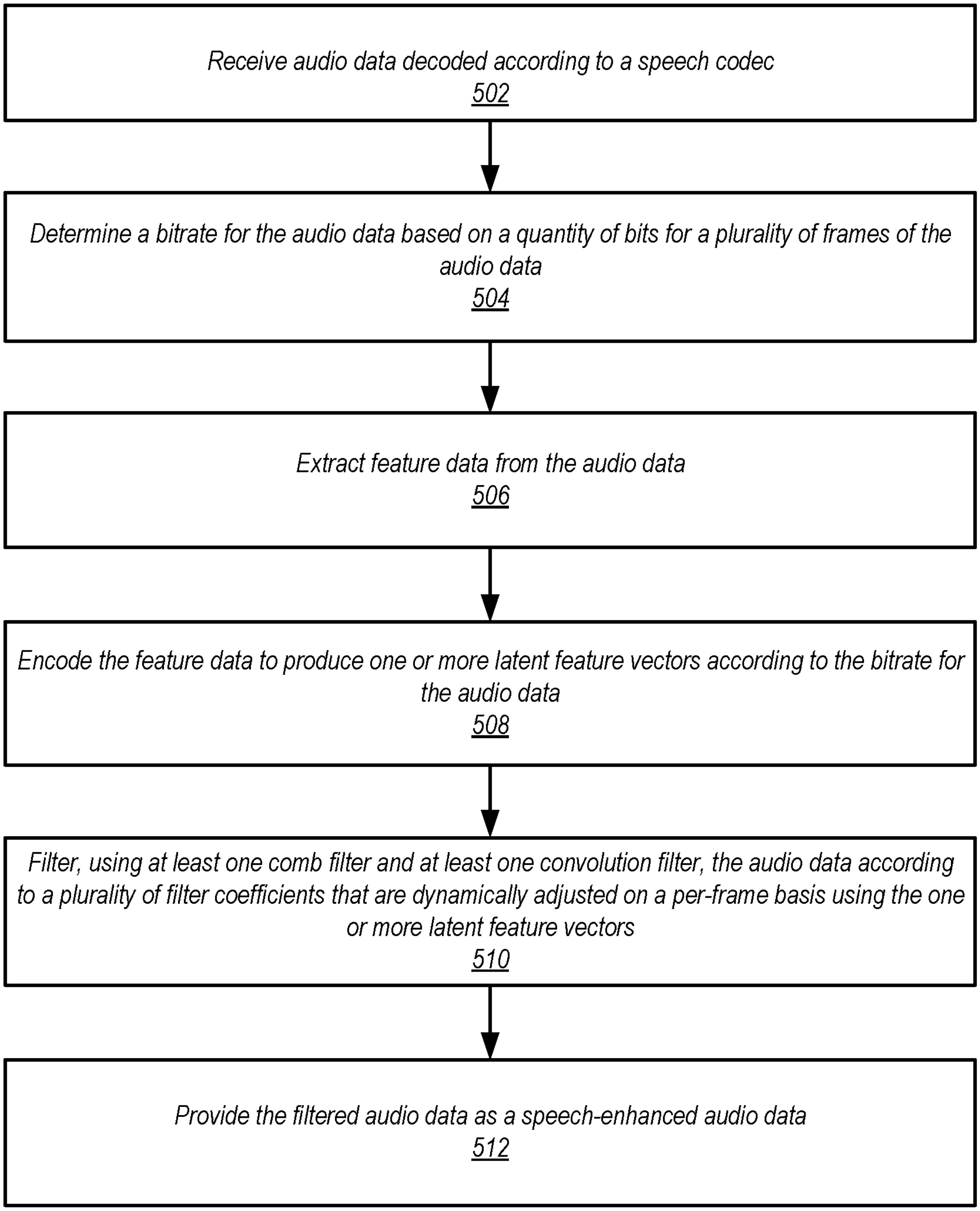
FIG. 5 illustrates a high-level flowchart of various methods and techniques to implement speech enhancement, according to some embodiments.

FIG. 4 illustrates a logical block diagram of an example speech enhancement model 100 that implements adaptive enhancement of coded speech, according to some embodiments. The example model 400 may be an adaptive coding enhancer (e.g., a linear-adaptive coding enhancer (LACE)) as described herein. The model 400 may include one or more features or aspects of the speech enhancement model 100 illustrated in FIG. 1, the provider network 200 illustrated in FIG. 2, the speech enhancement model 100 illustrated in FIGS. 2, 3A, 3B, and 3C, and/or the system 600 illustrated in FIG. 6. The model 400 may also implement one or more steps of the method illustrated and described with respect to FIG. 5.

As shown in FIG. 4, the model 400 may include features 402 from a speech codecs, a latent feature vector generator 404, and a plurality of adaptive filter(s) 410. The speech codecs providing the features 402 may be a decoder of a codec (e.g., CELP codec) as described herein. The features 402 may include are a mix of (quantized) clean speech features received from a decoder and features calculated from noisy decoded speech. Clean speech features may include linear prediction coefficients (LPCs) (e.g., converted to a 64-band equivalent rectangular band scale (ERB-scale), log magnitude spectrogram at a particular granularity (e.g., 40 ms granularity). Additionally, or alternatively, clean speech features may include a codec frame gain in log-domain at a particular granularity (e.g., 20 ms granularity). Additionally, or alternatively, clean speech features may include pitch lags (e.g., pitch lags 408) at a particular granularity (e.g., 5 ms granularity (embedded to $R^6$ 4). Additionally, or alternatively, clean speech features may include long-term predictor (LTP) filter taps at a particular granularity (e.g., 5 ms granularity). Noisy decoded speech may include a particular band cepstrum (e.g., a 28 band cepstrum) on particular size (e.g., 20 ms) frames at a particular granularity (e.g., 20 ms) following the CELP codec bands. Additionally, or alternatively, noisy decoded speech may include a quantity of auto-correlation values (e.g., 5) of the noisy sound mixture y(t) around the codec pitch lag 408 at a particular granularity (e.g., 5 ms granularity). The features 402 may be scale-invariant. In some cases, a codec frame gain and the constant term in the noisy speech cepstrum may not be scale-invariant due to the filtering in equation (4) being a non-linear operation that does not depend on the signal level. In some aspects, the features 402 may be up-sampled to a specified rate (e.g., 400 Hz) by repetition. In some aspects, along with the features, the codecs may include bitrate detection 402*b* for providing a bitrate to the adaptive filter(s) 104 concerning the speech signal 412 based on a quantity of bits for a plurality of frames of the speech signal 412. In some aspects, the features may be extracted from the speech signal 412 using the feature extraction 402*a*.

Since the type and strength of coding artifacts may depend on the bitrate, the model 400 may utilize the bitrate. However, since some codecs have a variable bitrate encoder, the target bitrate specified at the latent feature vector generator 404 may not be known to the decoder. For example, only the number of bits of the codec frames may be received and known. Since these values may produce a very noisy estimate of the bitrate, a raw number of bits and an exponential moving average with an updated bitrate on 0.1 to the latent feature vector generator 404 may be provided. To make these features more useful, raw number of bits (nbits) and the exponential moving average may be passed through an eight-dimensional Fourier-style saturating embedding whose components are given by Equation (5). In Equation (5), sin may be function that provides a mathematical sine given input parameters in the fraction, where the numerator captures the different dimensions k (which may equal 2, 4, . . . , 8). A bitrate range may be used, where A is the low-end of the bitrate range and B is the high-end of the bitrate range. Using the bitrate range and the raw number of bits (nbits), an exponential moving average may be determined, where a log function that takes a logarithm base 10 of its input parameters, which include both the max function (that returns the maximum value of its input parameters) and the min function (that returns the minimum value of its input parameters) to determine the numerator (at a given k value). The numerator may be determined for the different dimensions (k) divided by the same denominator, the log function base 10 of the high-end bitrate B divided by the low-end bitrate A. The saturation embedding may be trained so that there may be nothing to do for the system at very high bitrates. Thus, a single high bitrate may be added to training data to ensure that the system behaves well outside of the intended range of use.

$$\sin\left(\frac{(k(2\log(\max\{A, \min\{B, n_{bits}\}\}) - \log(A \cdot B)}{\log(B/A)}\right). \quad \text{Equation (5)}$$

Feature encoding may be performed using a sequential model of convolutions and transpose convolutions with tanh activations followed by a gated recurrent unit (GRU) to capture long-term dependencies. For example, as shown in FIG. 4, the latent feature vector generator 404 may receive the features 402 to produce latent feature vectors 406 as described herein. The latent feature vector generator 404 may include a first convolution layer 404*a*, a concatenative pooling layer 404*b*, a second convolution layer 404*c*, a transpose convolution layer 404*d*, and a gated recurrent unit (GRU) 404*e* aligned in series to produce the latent feature vectors 406 from the features 402. The first convolution layer 404*a* may receive the features 402 and perform scaling and dimensionality reduction on a dimensional features space to reduce to the features 402 to a number of channels (e.g., a 478-dimensional feature space, reducing the features to $N_r$=96 channels). Subsequently, the concatenative pooling layer 404*b* may combine information from multiple subframes (e.g., four (4) subframes) from the codec into one feature vector. Thereafter, the second convolution layer 404*c* may adjusts the number of channels to a hidden feature dimension ($N_h$) so that the transpose convolution layer 404*d* with $N_h$ channels performs a factor four (4) up-sampling back to the up-sampled to a specified rate (e.g., 200 Hz). Subsequently, the output from the transpose convolution layer 404*d* may be processed by the GRU 404*e* with $N_h$ hidden unites to generate the $N_h$-dimensional latent (e.g., hidden) feature vectors 406. The pooling and up-sampling may provide the model 400 with partial lookahead to the codec frame boundary. The model 400 may therefore be causal on the codec frame level but not causal on the codec sub-frame level.

As described herein, the model 400 may include a plurality of adaptive filters 410. As shown in FIG. 4, the plurality of adaptive filters 410 may receive pitch lags 408 from the features 402 and the latent feature vectors 406 produced by the latent feature vector generator 404. The plurality of adaptive filters 410 may also receive a speech signal 412 and using adaptive coefficients for the filters 410 produce an enhanced or modified speech signal 414. For instance, the plurality of adaptive filters 410 may include a first adaptive comb filter 410*a*, a second adaptive comb filter 410*b*, and an adaptive convolution filter 410*c*. The plurality of adaptive filters 410 may be finite impulse response (FIR) filters that filters the received speech signal 412 to perform format enhancement.

For the adaptive convolution filter 410*c*, coefficients for the adaptive convolutional filter 410*c* ($h_n(\tau)$) may be calculated on a frame-basis from the latent feature vectors 406 characterized by Equation (6), as the product of the filter shape ($K_n$) and the filter gain ($g_n$).

$$h_n(\tau)=g_n K_n(t) \quad \text{Equation (6).}$$

To determine the filter shape $K_n$ is the filter shape calculated using Equation (7), where the trainable projection matrix for the filter ($W_k$) multiplied by the feature vectors ($\varphi_n$) with added bias ($b_k$) is divided by the L2 norm of the trainable projection matrix for the filter ($W_k$) multiplied by the feature vectors ($\varphi_n$) with added bias ($b_k$).

$$K_n = \frac{(W_k\varphi_n + b_k)}{\|W_k\varphi_n + b_k\|_2}. \quad \text{Equation (7)}$$

and $g_n$ is the filter gain calculated using the exponential of a scaling factor ($\alpha$) multiplied by the hyperbolic tangent function (tanh) of the trainable projection matrix for the gain ($W_g$) multiplied by the feature vectors ($\varphi_n$) with added bias ($b_g$) as described in Equation (8).

$$g_n=\exp(\alpha \tanh(W_g\varphi_n+b_g) \quad \text{Equation (8).}$$

Splitting the filter coefficients into shape and gain may be similar to weight normalization for some convolutional layers. In some aspects, splitting the filter coefficients into shape and gain may limit the maximal amplification of the filter as a precautionary measure. To avoid transition artifacts, the filters may be interpolated on the first half of the frame length (e.g., 5 ms frame length) using a cosine window (w( )) at time (t) where N denotes the frame size (e.g., 80) and s denotes time warping the window size, characterized using Equation (9).

$$w(t) = \begin{cases} 1+\cos(2\pi t/N) & \exists s{:}sN \le t < (s+1/2)N \\ 0 & \text{else,} \end{cases}. \quad \text{Equation (9)}$$

On the nth frame, an Adaptive Convolutional filter (AdaConv) for the clean signal (x), feature vectors ($\varphi$) and time (t), the adaptively filtered signal may be determined using cosine window (w), coefficients ($h_n$), and delay ($\tau$) as characterized in Equation (10).

$$AdaConv(x(\cdot), \phi.)(t) = \sum_{r=0}^{k-1} x(t-\tau)(w(t)h_{n-1} + (1-w(t)h_n)(\tau). \quad \text{Equation (10)}$$

For the first adaptive comb filter 410*a* and the second adaptive comb filter 410*b*, these filters may be similar to the adaptive convolution filter 410*c*, but the FIR filter taps may be moved around the pitch lags (e.g., pitch delays $p_n$) 408. Further, the two adaptive comb filters 410*a* and 410*b* provide a second learnable gain $\gamma_n$ to control the comb-filter strength according to the exponential function applied to an initial gain ($\beta$) from which is subtracted the leaky rectified linear units (ReLU) of the trainable projection matrix multiplied by the feature vectors with added bias (($W_g\varphi_n+b_g$) which is characterized by Equation (11).

$$\gamma_n=\exp(\beta-\text{ReLU}(W_\gamma+b_\gamma)). \quad \text{Equation (11).}$$

The transfer function ($H_n(z)$) for a z transform on frame n may multiply the gain ($g_n$) with a form of a half Hann window $$\left(1+\gamma_n z^{-p_n+\left\lfloor\frac{k}{2}\right\rfloor}\sum\nolimits_{\ell=0}^{k-1} K_n(\ell)z^{-\ell}\right)$$

where k denotes the filter length, $p_n$ are pitch delays, and l is the delay operator, and is thus characterized by Equation (12).

$$H_n(z) = g_n\left(1-\gamma_n z^{-p_n+\lfloor k/2\rfloor}\sum_{\ell=0}^{k-1} k_N(\ell)z^{-\ell}\right). \quad \text{Equation (12)}$$

The first adaptive comb filter 410*a* and the second adaptive comb filter 410*b* may interpolated using Equation (10). Since comb filtering may only be used for voiced speech parts and since it may cause undesirable coloration on unvoiced speech parts unvoiced frames may be set to $p_n=\lfloor k/2\rfloor$. This may turn the first adaptive comb filter 410*a* and the second adaptive comb filter 410*b* into additional adaptive convolution filters (e.g., like adaptive convolution filters 410*c*), thereby increasing the spectral shaping capability of the model 400.

In some aspects, the model 400 may use few (e.g., fewer) hyper parameters. For example, one hyper parameter may be the reduced feature dimension $N_r$, which may have a value of ninety-size (96). Another hyper parameter may be the dimension of the hidden feature space $N_h$, which may be a value of one-hundred twenty-eight (128). Yet another hyper parameter may be kernel size k for the filtering modules (e.g., the first adaptive comb filter 410*a*, the second adaptive comb filter 410, the adaptive convolution filter 410*c*) which may be a value of fifteen (15).

Since, in some cases, the model 400 may be linear (e.g., completely linear) in the speech signal path, frequency responses may be analyzed to determine local system behavior. In some cases, for low bit-rates the model 400 may perform strong comb-filtering and also significant envelope/level adjustment. In some cases, for higher bitrates the model 400 may approach an identity function, which is the intended behavior.

With the model 400, adaptive convolutions may be used to enhance coded speech at low to medium bitrates. The model 400 may be phase-preserving and may operate without lookahead and as such may be seamlessly integrated into a plurality of codecs as described above. Furthermore, the model 400 may be low in complexity and parameter count and as such may be used on common laptops, mobile phones, and/or any other small or portable communication devices without causing significant overhead.

In various embodiments, the model 400 may be implemented as part of various network-based systems or services or stand-alone systems that receive audio data (e.g., a speech waveform, which may include target speaker audio and various background audio) and provide as output enhanced audio data (e.g., an output waveform, which may include enhanced target speaker audio and various background audio). For example, an audio processing model 400 may be implemented "service-side," as illustrated in FIG. 3A, where the audio sensors that capture the audio data may be separate from a service or system that implements the model 400. In such embodiments, the audio data may be sent from the audio sensor/microphone (e.g., over a network connection) to the system or service for audio processing. In other embodiments, the model 400 may be implemented as part of a same device as the audio sensor (e.g., as part of an audio processing component or system implemented within a device that includes an audio sensor, such as a mobile phone or device, including various types of "smart" phones, "smart" speakers, "smart" televisions, content delivery or audio/video streaming devices that capture audio data, and so on).

In some aspects, the model 400 may be a machine learning model that is trained with the training data. For example, the model 400 may be trained on 165 hours of clean speech sampled at 16 kHz collected from multiple high-quality TTS datasets, which contains more than 900 speakers in 34 languages and dialects. The data may be augmented using random scaling and random equalization. The coded signal may be obtained with a modified version of libopus, restricting the encoder to wideband and linear-predictive mode only. Furthermore, the encoder parameters complexity may be changed, packet loss percent and bitrate randomly every 249 frames. Since some codecs (e.g., OPUS™) may applies a high-pass filter to the clean signal before encoding in linear-predictive mode, the high-pass filtered clean signal may be used as the target. Furthermore, a pre-emphasis with P(z)=1−0.85z−1 may be applied to both the noisy input signal and the clean target signal. Hyper parameters $N_r$=96, $N_h$=128 and k=15 may be chosen which results in a model size of 306 K parameters and 99 MFLOPS complexity.

In some aspects, a mixture of regression losses may be used to train the model 400, which are tailored to different tasks. One loss is calculated in the time domain and the other two losses may be calculated on short-time Fourier transforms (STFTs) with window size equal to discrete Fourier transform (DFT) size and 50% overlap. The STFT losses may be averaged over different resolutions with DFT sizes 2n, n=5, 6, . . . , 12. All STFTs are calculated with Hann windows. The model 400 may not be intrinsically phase preserving. In some aspects, the only zero-phase filter the model 400 may implement is the identity. Thus, the model 400 may be biased towards phase preservation in periodic signal parts, where x is the clean signal and ŷ is the enhanced signal as discussed above by applying a weighted squared error loss $£_{phase}$ as shown in Equation (13).

$$\mathcal{L}_{phase} = \frac{\|x - \hat{y}\|_2^2}{\|\hat{y}\|_2}. \quad \text{Equation (13)}$$

The weighting by 1/||ŷ||2 may modify the L2 loss behavior on unvoiced signal parts. In some instances, the MSE loss may lead to loss of unvoiced signal parts since x(t) and y(t) will be largely uncorrelated. However, for uncorrelated x(t) and y(t) the weighted version may attain its global minimum at ||x||2=||ŷ||2 (as opposed to ||y||=0 for the unweighted MSE loss) which makes the loss energy preserving in this case. For envelope reconstruction, a set of perceptually motivated filters may be applied to smooth the absolute values of the STFT coefficients. The filters may be approximations to the auditory filters following an ERB scale. As envelope loss, $£_{env}$, may use the L1 loss on the resulting smooth spectrograms $X_s$ and $Y_s$ as shown in Equation (14).

$$\mathcal{L}_{env} = \left\|\log(X_s) - \log(\hat{Y}_s)\right\|_1, . \quad \text{Equation (14)}$$

To restore the harmonic structure, a modification of the spectral convergence loss $£_{spec}$ may be used, where the Frobenius norm may be replaced by a cross-correlation based loss, which makes it insensitive to signal scale. The cross-correlation may be calculated both over time and frequency as shown in Equation (15) with a total loss $£_{total}$ as calculated in Equation (16).

$$\mathcal{L}_{spec} = 1 - \frac{\sum_{n,k} |X(n,k)|\left|\hat{Y}(n,k)\right|}{\left(\sum_{n,k} |X(n,k)|^2 \sum_{n,k} \left|\hat{Y}(n,k)\right|^2\right)^{1/2}}. \quad \text{Equation (15)}$$

$$L_{total} = 10L_{phase} + 2L_{env} + L_{spec} \quad \text{Equation (16).}$$

The model 400 may be trained using the Adam optimizer with β1=0.9 and β2=0.999 on sequences of 0.5 s length with a mini-batch size of 256 and an initial learning rate λ=5×10−4 for 50 epochs or ~230 steps. A learning rate decay may be used with a factor 2.5×10−5, i.e. in step u the weights are updated with a learning rate λ/(1+2.5×10−5μ).

In some aspects, since the model 400 signal path may be linear local model behavior may be observed by analyzing frequency responses. For low bitrates, the model 400 may perform strong comb filtering and for higher bitrates the model 400 may approaches the identity function, which may be an intended behavior.

FIG. 5 illustrates a high-level flowchart of various methods and techniques to implement adaptive enhancement of coded speech, according to some embodiments. The method of FIG. 5 may be used to implement adaptive coding enhancement as described herein. The method of FIG. 5 may be implemented using one or more features or aspects of the model 100 illustrated in FIGS. 1 and 2, the provider network 200 illustrated in FIG. 2, the model 100 illustrated in FIGS. 2, 3A, 3B, and 3C, the model 400 illustrated in FIG. 4, and/or the system 600 illustrated in FIG. 6.

At block 502, a speech enhancement model (e.g., the speech enhancement model 100 illustrated in FIG. 1, the speech enhancement model 400 illustrated in FIG. 4) receives audio data decoded according to a speech codec. For example, the model may receive audio data from one or more microphones and/or one or more audio data storage devices. The audio data may be encoded according to a decoder codec. At block 504, the model determines a bitrate for the audio data based on a quantity of bits for a plurality of frames of the audio data. For example, since the type and strength of coding artifacts may depend on the bitrate, the adaptive coding enhancer may utilize the bitrate. However, since some codecs have a variable bitrate encoder, the target bitrate specified at the encoder may not be known to the decoder. In some instances, only the number of bits of the codec frames may be received and known. Since these values may produce a very noisy estimate of the bitrate, a raw number of bits and an exponential moving average with an updated bitrate on 0.1 to the encoder may be provided. To make these features more useful, raw number of bits and the exponential moving average may be passed through an eight-dimensional Fourier-style saturating embedding, as discussed above with regard to equation (5).

At block 506, the model extracts feature data from the audio data. The features (e.g., feature data) may include a mix of (quantized) clean speech features received from a decoder and features calculated from noisy decoded speech. Clean speech features may include linear prediction coefficients (LPCs) (e.g., converted to a 64-band equivalent rectangular band scale (ERB-scale), log magnitude spectrogram at a particular granularity (e.g., 10 ms granularity). Additionally, or alternatively, clean speech features may include a codec frame gain in log-domain at a particular granularity (e.g., 20 ms granularity). Additionally, or alternatively, clean speech features may include pitch lags (e.g., pitch lags 108) at a particular granularity (e.g., 5 ms granularity (embedded to $R^6$ 5). Additionally, or alternatively, clean speech features may include long-term predictor (LTP) filter taps at a particular granularity (e.g., 5 ms granularity). Noisy decoded speech may include a particular band cepstrum (e.g., an 18 band cepstrum) on particular size (e.g., 20 ms) frames at a particular granularity (e.g., 10 ms) following the CELP codec bands. Additionally, or alternatively, noisy decoded speech may include a quantity of auto-correlation values (e.g., 5) of the noisy sound mixture y(t) around the codec pitch lag at a particular granularity (e.g., 5 ms granularity). The features may be scale-invariant. In some cases, a codec frame gain and the constant term in the noisy speech cepstrum may not be scale-invariant due to the filtering in equation (4) being a non-linear operation that does not depend on the signal level. In some aspects, the features 102 may be up-sampled to a specified rate (e.g., 200 Hz) by repetition.

At block 508, the model encodes the feature data to produce one or more latent feature vectors according to the bitrate for the audio data. Feature encoding may be performed using a sequential model of convolutions and transpose convolutions with tanh activations followed by a gated recurrent unit (GRU) to capture long-term dependencies. For example, the encoder may receive the features to produce latent feature vectors as described herein. The encoder may include a first convolution layer, a concatenative pooling layer, a second convolution layer, a transpose convolution layer, and a gated recurrent unit (GRU) aligned in series to produce the latent feature vectors from the feature data. The first convolution layer may receive the features and perform scaling and dimensionality reduction on a dimensional features space to reduce to the features to a number of channels (e.g., a 178-dimensional feature space, reducing the features to Nr=96 channels). Subsequently, the concatenative pooling layer may combine information from multiple subframes (e.g., four (4) subframes) from the codec into one feature vector. Thereafter, the second convolution layer may adjusts the number of channels to a hidden feature dimension ($N_h$) so that the transpose convolution layer with $N_h$ channels performs a factor four (4) up-sampling back to the up-sampled to a specified rate (e.g., 200 Hz). Subsequently, the output from the transpose convolution layer may be processed by the GRU **404*e* with $N_h$ hidden unites to generate the $N_h$-dimensional latent (e.g., hidden) feature vectors. The pooling and up-sampling may provide the model 400** with partial lookahead to the codec frame boundary. The model may therefore be causal on the codec frame level but not causal on the codec sub-frame level.

At block 510, the model filters, using at least one comb filter and at least one convolution filter, the audio data according to a plurality of filter coefficients that are dynamically adjusted on a per-frame basis using the one or more latent feature vectors. At block 512, the model provides the filtered audio data as speech-enhanced audio data. As described herein, a plurality of adaptive filters may receive pitch lags from the features and the latent feature vectors produced by the encoder. The plurality of adaptive filters may also receive the audio data and using adaptive coefficients for the filters produce an enhanced or modified audio data from the audio data. For instance, the plurality of adaptive filters may include a first adaptive comb filter, a second adaptive comb filter, and an adaptive convolution filter. The plurality of adaptive filters may be finite impulse response (FIR) filters that filters the received audio data to perform format enhancement. For the first adaptive comb filter and the second adaptive comb filter, these filters may be similar to the adaptive convolution filter, but the FIR filter taps may be moved around the pitch lags (e.g., pitch delays). Further, the two adaptive comb filters and provide a second learnable gain to control the comb-filter strength. The first adaptive comb filter and the second adaptive comb filter may interpolated using Equation (10). Since comb filtering may only be used for voiced speech parts and since it may cause undesirable coloration on unvoiced speech parts unvoiced frames may be set to pn=[k/2]. This may turn the first adaptive comb filter and the second adaptive comb filter into additional adaptive convolution filters (e.g., like adaptive convolution filters), thereby increasing the spectral shaping capability of the model.

In some aspects, the comb filters may receive the one or more latent feature vectors, the one or more pitch lags, and successive versions of the speech signal. The comb filters may calculate respective coefficients for the plurality of comb filters, and apply the respective coefficients to the successive versions of the speech signal. Subsequently, the convolution filter may receive the one or more latent feature vectors and a cumulative speech signal output from the plurality of comb filters, and calculate a convolution coefficient based on the one or more latent feature vectors. The convolution filter may apply the convolution coefficient to the cumulative speech signal output from the plurality of comb filter to generate the enhanced speech signal.

In some aspects, the model may use few (e.g., fewer) hyper parameters. For example, one hyper parameter may be the reduced feature dimension Nr, which may have a value of ninety-size (96). Another hyper parameter may be the dimension of the hidden feature space Nh, which may be a value of one-hundred twenty-eight (128). Yet another hyper parameter may be kernel size k for the filtering modules (e.g., the first adaptive comb filter, the second adaptive comb filter, the adaptive convolution filter) which may be a value of fifteen (15).

Although FIGS. 1-5 have been described and illustrated in the context of a provider network implementing an audio-transmission service, the various components illustrated and described in FIGS. 1-5 may be easily applied to other systems that implement audio processing. As such, FIGS. 1-5 are not intended to be limiting as to other embodiments for audio processing.

The methods described herein may in various embodiments be implemented by any combination of hardware and software. For example, in one embodiment, the methods are implemented on or across one or more computer systems (e.g., a computer system as in FIG. 6) that includes one or more processors executing program instructions stored on one or more computer-readable storage media coupled to the processors. The program instructions may implement the functionality described herein (e.g., the functionality of various servers and other components that implement the audio processing system described herein). The various methods as illustrated in the figures and described herein represent example embodiments of methods. The order of any method may be changed, and various elements may be added, reordered, combined, omitted, modified, etc.

Figure 6:
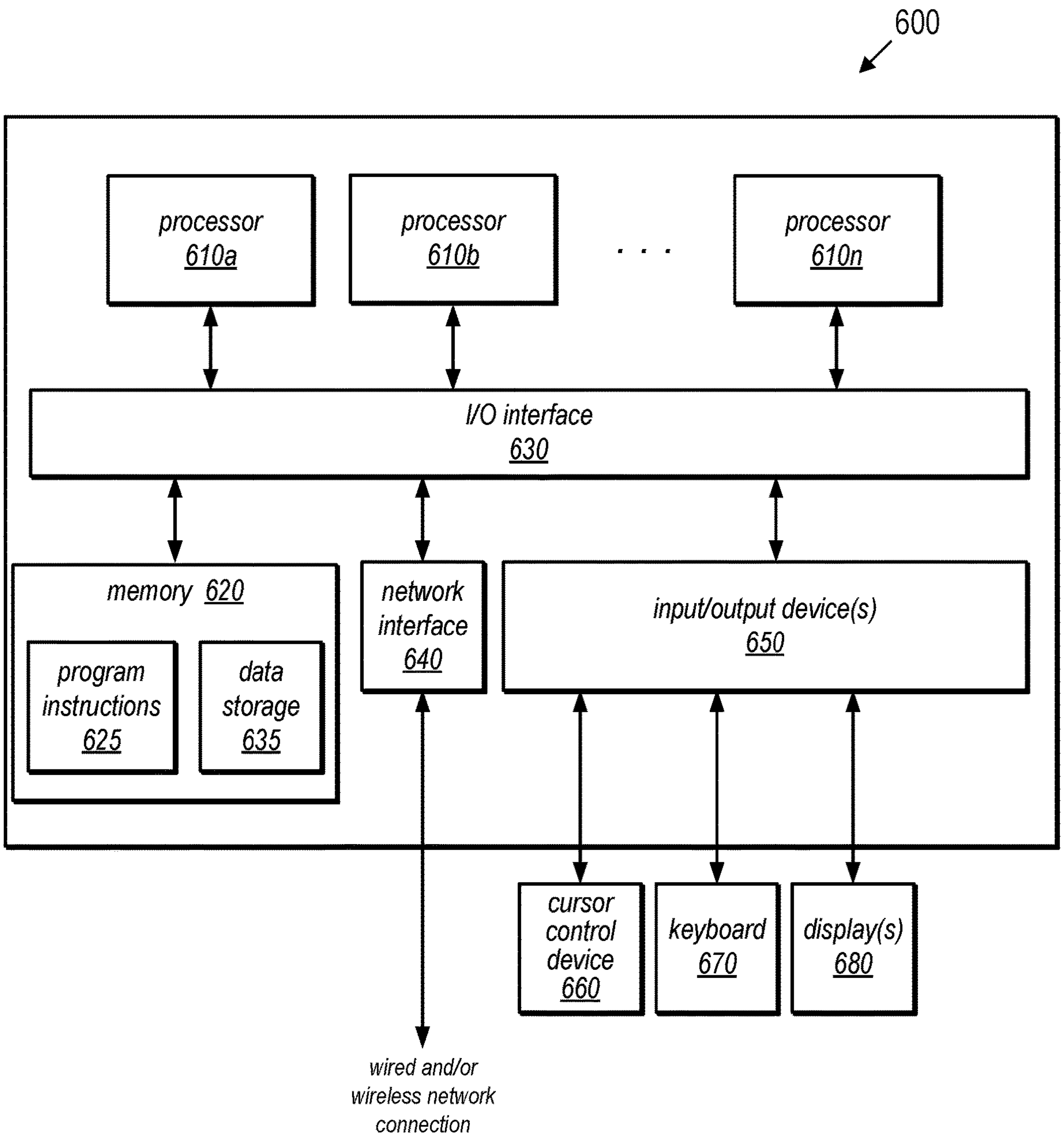
FIG. 6 illustrates an example system to implement the various methods, techniques, and systems described herein, according to some embodiments.

Embodiments of efficient voice synthesis using frame-based processing as described herein may be executed on one or more computer systems, which may interact with various other devices. One such computer system is illustrated by FIG. 6. In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 600 includes one or more processors 610 (for example, processor 610*a*, processor 610*b*, and/or processor 610*n*) coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. Display(s) 680 may include standard computer monitor(s) and/or other display systems, technologies or devices. In at least some implementations, the input/output devices 650 may also include a touch or multi-touch enabled device such as a pad or tablet via which a user enters input via a stylus-type device and/or one or more digits. In some embodiments, it is contemplated that embodiments may be implemented using a single instance of computer system 600, while in other embodiments multiple such systems, or multiple nodes making up computer system 600, may host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 620 may store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio processing as described above are shown stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a non-transitory, computer-readable storage medium may include storage media or memory media such as magnetic or optical media, e.g., disk or CD/DVD-ROM coupled to computer system 600 via I/O interface 630. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 640.

In one embodiment, I/O interface 630 may coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor 610.

Network interface 640 may allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 625, that implement the various methods and techniques as described herein, including the application of efficient voice synthesis using frame-based processing, comprising various data accessible by program instructions 625. In one embodiment, program instructions 625 may include software elements of embodiments as described herein and as illustrated in the Figures. Data storage 635 may include data that may be used in embodiments. In other embodiments, other or different software elements and data may be included.

Those skilled in the art will appreciate that computer system 600 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a deep neural network (DNN) machine learning model trained to enhance speech, the machine learning model configured to:

receive audio data decoded according to a speech codec, determine a bitrate for the audio data based on a quantity of bits for a plurality of frames of the audio data, extract feature data from the audio data, and encode the feature data to produce one or more latent feature vectors according to the bitrate for the audio data, filter the audio data according to a plurality of filter coefficients that are dynamically adjusted on a per-frame basis using the one or more latent feature vectors, and provide the filtered audio data as speech-enhanced audio data.

2. The system of claim 1, wherein respective latent feature vectors of the latent features vectors utilize information within a single frame of respective feature data.

3. The system of claim 1, wherein the feature data comprises one or more clean speech features received by a decoder codec and one or more noisy speech features calculated from noisy decoded speech.

4. The system of claim 1, wherein the audio data is filtered using a plurality of filters, wherein the plurality of filters comprises:

at least one comb filter configured to:

receive the one or more latent feature vectors, one or more pitch lags, and successive versions of the audio data for filtering, calculate respective filter coefficients for the plurality of comb filters, and apply the respective coefficients for filter the successive versions of the audio data; and at least one convolution filter configured to:

receive the one or more latent feature vectors and a cumulative audio data output from the plurality of comb filters, and calculate a convolution coefficient based on the one or more latent feature vectors, and apply the convolution coefficient to the cumulative audio data output from the plurality of comb filters to generate the speech-enhanced audio data.

5. The system of claim 4, wherein the convolutional filter is configured to split respective coefficients to limit amplification of the convolutional filter.

6. The system of claim 1, wherein the bitrate is further determined based on an exponential moving average within an update rate applied for encoding the feature data.

7. A method, comprising:

receiving audio data decoded according to a speech codec;

processing the audio data through a deep neural network (DNN) machine learning model trained to enhance speech, wherein the DNN machine learning model:

extracts feature data from the audio data, determines a bitrate for the audio data based on a quantity of bits received for a plurality of frames of the audio data, encodes the feature data as one or more latent feature vectors according to the bitrate for the audio data, filters, using at least one comb filter and at least one convolution filter, the audio data according to a plurality of filter coefficients that are dynamically adjusted on a per-frame basis using the one or more latent feature vectors, and generates speech-enhanced audio data based, at least in part, on the filtering of the audio data.

8. The method of claim 7, wherein the latent feature vectors are generated at a rate that corresponds to a sub-frame rate for encoding the feature data.

9. The method of claim 7, wherein respective latent feature vectors of the latent features vectors utilize information within a single frame of respective features from the speech codec.

10. The method of claim 7, wherein the feature data comprises one or more clean speech features and one or more noisy speech features calculated from noisy decoded speech.

11. The method of claim 7, wherein the DNN machine learning model further normalizes respective coefficients to limit a gain for limiting amplification during filtering at the at least one convolutional filter.

12. The method of claim 7, wherein the bitrate is further determined based on filtering raw payload sizes for a plurality of frames of the audio data.

13. One or more non-transitory, computer-readable storage media, storing program instructions that when executed on or across one or more computing devices of cause the one or more computing devices to implement:

receiving audio data decoded according to a speech codec;

causing the audio data to be processed through a deep neural network (DNN) machine learning model trained to enhance speech, wherein the DNN machine learning model:

extracts feature data from the audio data, determines a bitrate for the audio data based on a quantity of bits received for a plurality of frames of the audio data, encodes the feature data as one or more latent feature vectors according to the bitrate for the audio data, filters the audio data according a plurality of filter coefficients that are dynamically adjusted on a per-frame basis using the one or more latent feature vectors, and generates speech-enhanced audio data as a result of filtering the audio data.

14. The one or more non-transitory, computer-readable storage media of claim 13, wherein the latent feature vectors are generated at a rate that corresponds to a sub-frame rate for encoding the feature data.

15. The one or more non-transitory, computer-readable storage media of claim 13, wherein respective latent feature vectors of the latent features vectors utilize information within a single frame of respective features from the decoder codec.

16. The one or more non-transitory, computer-readable storage media of claim 13, wherein the feature data comprises one or more clean speech features and one or more noisy speech features calculated from noisy decoded speech.

17. The one or more non-transitory, computer-readable storage media of claim 13, wherein the bitrate is further determined based on an exponential moving average within an update rate applied for encoding the feature data.

18. The one or more non-transitory, computer-readable storage media of claim 13, wherein the DNN machine learning model further splits respective coefficients to limit amplification for filtering at a convolutional filter.

* * * * *